Aug. 24, 1965   M. J. BACHELDER ETAL   3,202,742
PROCESS FOR PRODUCING PATTERNED PLASTIC ARTICLES
Filed Oct. 24, 1962
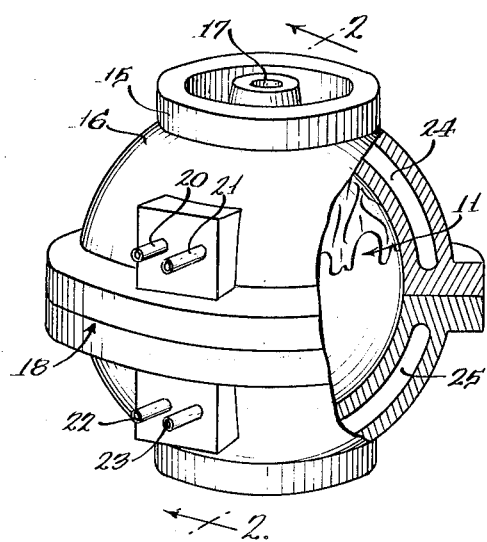
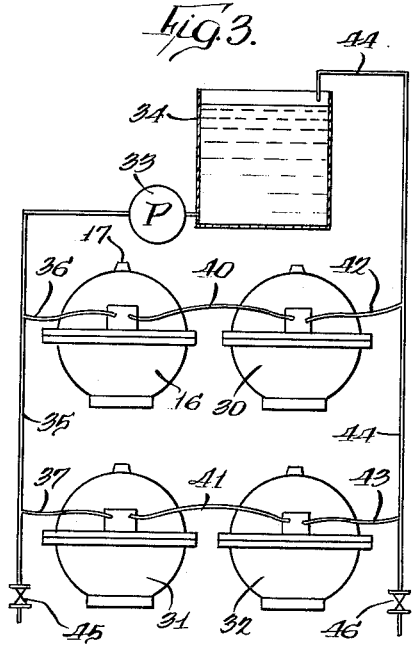
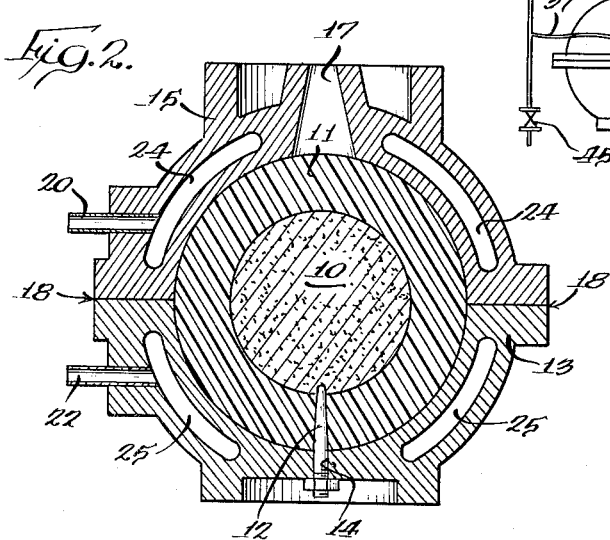
INVENTORS:
Millard J. Bachelder
Fred E. Hatchell
William J. Diamond
By Hofgren, Brady,
Wegner, Allen & Stellman
Attys United States Patent Office 3,202,742
Patented Aug. 24, 1965

3,202,742
PROCESS FOR PRODUCING PATTERNED
PLASTIC ARTICLES
Millard J. Bachelder, Utica, N.Y., Fred E. Satchell, Muskegon, Mich., and William J. Diamond, Lexington, Ky., assignors to Brunswick Corporation, a corporation of Delaware
Filed Oct. 24, 1962, Ser. No. 232,803
15 Claims. (Cl. 264—108)

This invention relates to a method for producing plastic articles and more particularly plastic bowling balls having particles of pattern material dispersed therein in a design configuration.

It has been customary in the art of manufacturing bowling balls to provide a core cover of hard rubber which is opaque and generally black in color. This hard rubber cover is molded about the core of the ball and then vulcanized in place.

Where it is desirable to produce a transparent or translucent bowling ball cover, hard rubber has not been adaptable due to the opacity of the rubber and/or its attendant curing agents. More recently, it has been suggested that thermosetting resins be used as the cover material. Such resins may be highly adaptable for providing a variety of colors and/or visual effects in such molded articles as bowling balls.

A bowling ball having a cover, which is colorable by the inclusion of dye materials and the like within the cover material is disclosed in copending patent application Serial No. 798,234, filed March 9, 1959, now Patent No. 3,068,007, by Fred E. Satchell. In that application it is additionally disclosed that pearl-like materials, plastic or aluminum flakes or powders and powders of other metals such as copper, bronze and brass can be suspended in the resin to create additional effects in appearance.

It is a general object of this invention to provide new and useful molded objects and especially bowling balls having a resin cover containing particles of pattern materials dispersed within the cover in a design configuration.

It is a further object of this invention to provide such a bowling ball which can be made in a variety of colors and pattern material configurations.

It is still another object of this invention to provide a durable bowling ball having novel appearance qualities.

It is yet another object of this invention to provide a bowling ball which comprises a core and a cover surrounding the core, which cover is a cured resin containing particles of pattern material in a configuration which is created by thermal convection currents.

It is still another object of this invention to provide a method for making a bowling ball by surrounding a core with a cured resin containing pattern materials, subjecting the resin in its unset state to the action of thermal convection currents, and setting the resin to retain the configuration created by the currents in the appearance of the resulting bowling ball.

Other objects and advantages of this invention including the establishment of predictability of patterns in accordance herewith, the provision of a plurality of such bowling balls of similar configuration and especially a plurality of bowling balls of similar appearance wherein the appearance is preselected, and still other objects or advantages, will be apparent to those in the art from the following description taken together with the accompanying drawings.

In the drawings:
FIGURE 1 illustrates an embodiment of a mold usable in accordance herewith and containing an embodiment of a bowling ball of this invention;
FIGURE 2 is a sectional view taken vertically through the center of the mold and bowling ball of FIGURE 1 along lines 2—2 and showing a vertical section of the mold and bowling ball in place therein; and
FIGURE 3 is a schematic diagram of a system of this invention employing a plurality of molds.

In accordance herewith we have provided a method for configurating pattern material within a thermosetting resin. Particles of the pattern material are included in the resin and the resin is then subjected to thermal convection currents which are sufficient to interrupt the normal disposition of the particles within the resin and dispose the particles in a pattern within the resin while the resin is in its fluid state. The resin is then transformed to its solid state with the particles arranged in the pattern. Thus, there is produced a resinified article of manufacture made of a solid resin containing particles of pattern material disposed therein in a design defined by thermal convection currents through the resin.

In such a manner there can be provided a bowling ball which has a core and a cover. The cover of the bowling ball is a cured resin containing particles of the pattern material trapped by setting in the configuration created by the thermal convection currents.

In addition to the provision of new and useful bowling balls, we have provided the technique of casting the thermosetting resin containing the particles to create new and pleasing patterns in the bowling ball cover. The technique may include the use of a new mold and mold system capable of conveniently creating convection currents within the liquid resin so that upon setting of the resin a pattern is achieved within the bowling ball cover. The pattern created can be a predictable pattern by control of the convection currents and the pattern may also thereby become repeatable within a plurality of bowling balls, thereby providing a set of bowling balls which are substantially matched in appearance.

Referring now to the drawings, the bowling ball of this invention comprises a core 10 and a core cover 11. Core 10 is generally made of sawdust, cork, residual cover stock, microballoon or the like bonded together by a thermoset resin, such as a polyester resin or similar epoxy, urea, acrylic or phenolic resin. The core, prior to molding of the cover, is set within the mold as illustrated in FIGURE 2 on pin 12 at the heavy end of the core. The other end of pin 12 fits a recess portion of mold 16 generally at 14.

The production of usable core and its mounting within the mold is more particularly described in patent application, Serial No. 798,234. The cores described therein are usable in accordance herewith. An example of satisfactory rigid polyester resin for bonding together cork, sawdust or other core material is disclosed in Serial No. 798,234 as follows:

*Rigid polyester resin*

| | Percent by weight |
|---|---|
| Butylene glycol | 21 |
| Diethylene glycol | 23.3 |
| Isophthalic acid | 37.9 |
| Fumaric acid | 17.66 |
| Triphenyl phosphite | .1 |
| Hydro quinone | .2 |

65% of styrene or vinyl toluene

In making the core, it is preferred to use a small amount of catalyst, such as benzoyl peroxide to decrease the polyester resin bond curing time.

Still with reference to the figures, in the production of a bowling ball in accordance herewith, core 10 is supported on pin 12 within mold 16. A mixture of thermosetting resin containing small amounts of pattern material, such as pearl-like guanine, is introduced into the mold cavity at 17. The mold cavity is formed by sections 15 and 13 joined as shown at 18 to form a cavity enclosure. After introduction of the resin and guanine, water is charged through port 22 to heat exchange jacket 25 and withdrawn therefrom through port 23. The water withdrawn can be recirculated if desired. The water introduced through inlet 22 is at a constant temperature to maintain a constant temperature within jacket 25. The heat convection currents which are established within the resin mass disrupt the normal dispersion of guanine in the resin and cause the guanine to become rearranged in configuration dictated by the convection currents.

The temperature of the water circulated in jacket 24 is sufficient to cause thermosetting after establishment of the desired pattern of guanine in the resin. Alternatively, the mold and resin within it may be baked at a temperature and for a period of time sufficient to set the resin. After the resin is set, the ball is gradually cooled to room temperature. The cooling may be effected by heat exchange through jackets 24 and 25 if desired. The mold is then separated at 18 and the ball is removed and finished to a smooth highly polished outer surface. The aperture made in the ball by the support pin 12 is eliminated by drilling and plugging with a thermosetting resin.

As a result of application of heat through jacket 25, the resulting bowling ball has a configuration defined by displaced or oriented guanine particles and corresponding to a plurality of flower petals placed vertically about the core within the cover. This pattern can be replaced by a pattern having a feather-like configuration by supplying the hot water to jacket 24 in lieu of jacket 25. With hot water being supplied to both jackets 24 and 25, the resulting configuration is a striated pattern. A mold of a different configuration providing jacketing of one side of the mold cavity, with heat exchange fluid flowing through the one side, produces a configuration having a multitude of convolutions resembling a clamshell. Thus, a multitude of configurations may be produced using different directions of thermal convection currents through the resin prior to setting and it is intended that many additional patterns, not specifically described herein, are within the scope of the present invention.

With reference to FIGURE 1, the mold has been cut away to show a bowling ball in the mold.

Now turning to FIGURE 3, a system for producing a plurality of bowling balls in accordance herewith is provided. A source of constant temperature heat exchange fluid, e.g. water, is maintained in tank 34 and pumped therefrom by pump 33 through line 35, lines 36 and 37 and into heat exchange jackets within molds 16 and 31. The effluent from molds 16 and 31 is charged through lines 40 and 41 through heat exchange jackets in molds 30 and 32 and recharged to tank 34 through lines 42 and 43 and line 44. Additional molds may be placed in series or parallel or in parallel series between lines 35 and 44, e.g. beyond closed valves 45 and 46. With additional molds in the system, valves 45 and 46 are open and circulation is provided from line 35 and through the molds to line 44.

Using a system such as that described in FIGURE 3, the fluid in heat exchange with the resins in the molds is approximately the same in each mold, the temperature drop between molds being insignificant for the purpose herein. Each of molds 16, 30, 31 and 32 is of the same configuration especially with respect to the heat exchange jackets and, with connection of corresponding jackets to the heat exchange flow, each mold produces a bowling ball having essentially the same pattern configuration. Thus, the system is capable of providing a set of bowling balls which may be substantially matched as to pattern configuration. If the same coloring material is used in the resin introduced into each mold, the matched set will be of the same color. It is also possible, of course, to vary the color of the balls in a particular set produced by the system by adding a different dye or pigment to the resin for each mold.

Although in the descriptions herein the heat convection currents are described as being set up by application of heat to various parts of the resin material in its fluid state, it is to be understood that it is intended that such application of heat includes the establishment of any heat differential between areas of the resin. Thus, a cooling fluid may be circulated through the mold jackets or cooling may otherwise be applied to the resin in its liquid state to establish temperature differentials and resulting heat convection currents. Referring to FIGURE 3, a cooling fluid, e.g. cold water, can be maintained in tank 34 and utilized in the system described. Such cooling, of course, will result in a change in the pattern configuration of the ball when circulated through the same jackets as the heating fluid.

The temperature of tank 34 is controlled preferably at a constant temperature by means not shown but well known in the art, e.g. a thermistor controlling an electric heating element.

As another technique in producing a set of bowling balls of the same pattern configuration, rather than using a plurality of molds as shown in the system of FIGURE 3, each mold being supplied with resin through the top opening and being supplied with heat exchange fluid as described with reference to FIGURES 1 and 2, a single mold may be used with a plurality of subsequent molding operations. Accordingly, the ball molded in mold 16 as illustrated in FIGURES 1 and 2 is removed therefrom by separation of mold halves 15 and 13, the mold halves are rejoined and the molding operation is repeated using the same heat exchange at the same temperature, using the same resin including the same pattern material.

Although an embodiment of the process for making bowling balls has been described above with reference to the figures, it is to be understood that this invention is not limited to that embodiment. For example, the thermosetting resin can be any such resin having a viscosity at or below the setting temperature sufficiently low to permit heat convection currents to be established. The viscosity should also be sufficiently high at setting temperature to support the pattern material particles and preclude their settling to the bottom of the mold. Advantageously the resin is sufficiently transparent so that the pattern materials can be seen from the exterior. Translucent resins are usable and wherever "translucent" is used herein and in the appended claims it is intended to include "transparent" materials. Preferably the resins have a balance of Rockwell hardness and coefficient of friction to give playing characteristics to the ball, corresponding approximately to playing characteristics of hard rubber having a Rockwell hardness of about 80, "L" scale.

The resins include, for example, the polyester resins, alkyd resins, acrylic resins and epoxy resins. Thus, such resins may include, for example, polyethylene terephthalate which is the polyester of ethylene glycol and terephthalic acid, glyptal resin which is the polyester of glycerol and phthalic anhydride, epoxy resins having terminal epoxide groups such as may be prepared from epichlorohydrin and bisphenol, as well as such alkyd resins as the polyester of ethylene glycol and maleic anhydride, and the like. Additional usable polyester resins are the resins prepared by polyesterification of polycarboxylic acids such as succinic, tartaric, maleic, fumaric, citric, glutaric, adipic, pimelic, suberic, sebacic, benzophenone discarboxylic, phthalic, terephthalic, isophthalic, chlorosuccinic, etc., acids with such dihydroxy compounds, including polyhydroxy compounds, as ethylene glycol, glycerol, propylene glycol, polyglycols, propane-1,2-diol, butane-2,3-diol, polyglycerols, hexitols, and the like.

Usable resins in accordance herewith also include the acrylic resins formed by polymerization of acrylic-type acids such as acrylic acid, methacrylic acid, ethacrylic acid, etc., and derivatives thereof such as the nitriles, acid chlorides, amides, esters, or anilides. Typical examples of acrylic polymers are the homopolymers of the above acid, methyl methacrylate, butyl acrylate, ethyl methacrylate, ethyl acrylamide, acrylonitrile, ethyl ethacrylate, etc. The acrylic polymers may also be copolymers of acrylic monomers with other monomers such as styrene, vinyl acetate, vinyl chloride, butadiene, B-chlorobutadiene, vinyl ethers, etc. Plasticizers such as phthalic esters and monacetin may be desirable for use in some of the acrylic polymers.

It is fully intended that such resins can be modified with other resins, as is well known in the art. For example, alkyd, acrylic, epoxy and polyester-type resins or mixtures thereof may be modified if desired, by the incorporation of phenol-formaldehyde resins, polyurethane, drying oils, phenol-furfural resins, rubber latex, casein, etc.

It is further intended that any of the resins used herein may be modified by the use of fillers or inhibitors which are well known to those in the art. The preferred resins are the polyester resins, and in a more particular embodiment the polyester resins are used in combination with or in solution with an active monomer and especially a monoethylenically unsaturated monomer of the hydrocarbon class having open chain homopolymerizable ethylenic unsaturation. Such active monomers are exemplified by, but not limited to, styrene, alphamethyl styrene, divinyl benzene, methyl methacrylate, butyl acrylate, etc. Typical examples of usable thermosetting resins are the prepared resinified products of the acids and alcohols indicated in the molar proportions shown in Formulation I and II below dissolved in 40% styrene and containing 0.2% hydroquinone inhibitor, i.e.

Formulation I

| Component: | Mols |
|---|---|
| Propylene glycol | 7 |
| Diethylene glycol | 4 |
| Fumaric acid | 3 |
| Phthalic acid | 4 |
| Adipic acid | 3 |

Formulation II

| Component: | Mols |
|---|---|
| Propylene glycol | 6 |
| Dipropylene glycol | 5 |
| Maleic anhydride | 3 |
| Sebacic acid | 3 |
| Phthalic anhydride | 3 |

Dyes and pigments may be included within the resin along with the pattern material. Further, other novel and pleasing effects may be developed by pigmenting or otherwise coloring the core directly. Also the core may be covered with colored materials in single colors or in a variety of colors, patterns or designs, to produce a bowling ball having particular visual effects in varying degrees of clarity depending upon the translucency or transparency of the resin cover. Such effects attained by color treatment of the core may be used to supplement or contrast with the patterned or patterned and pigmented cover.

The pattern materials are used in the form of finely divided particles. The materials contrast with the resin and preferably have a reflectivity differing from that of the resin. The particles are capable of suspension in the resin at setting temperature of the resin and are of sufficient size so that they can be rearranged by thermal currents. More specifically the pattern materials include flake aluminum powders, mica flakes, flake bronze powders, synthetic pearlescent particles, so-called "natural pearl" (guanine obtained from fish scales), etc. The pattern materials usually have individual small particles which are flat and platelike and in addition have highly reflective major surfaces. The pearlescent materials are more particularly preferred because of the pleasing appearance produced by their use. Such pearlescent materials may have particle dimensions, for example, of about 1 micron in thickness and about 30 microns in diameter in platelet form which form appears in the synthetic materials. Such particles orient by the action of thermal currents with their greatest dimensions parallel with the direction of fluid flow as set up by currents in the resin. The so-called natural pearl materials, i.e. guanine, have a needle-like structure with highly reflective surfaces. The amount of pattern producing materials may vary from a trace amount, e.g. 0.01 weight percent, or less, up to 5%, or more, based on the weight of resin and depending upon the desired effect. Usually from 0.05% to 0.5% of the materials produces satisfactory results. Where color pigments or dyes are included, the ratio of color pigment or dye to pattern material is also a matter of choice to achieve the desired color result. The covering power of the dye or pigment will also influence the amount used. We have found that up to about a one to one ratio gives good results in producing an attractive article from the molding operation, although greater amounts of pigments or dyes can be used if desired. Usable dyes and pigments are well known in the art.

The molding temperatures and times are sufficient to set the resin with the pattern materials dispersed by thermal currents. The temperature and time will depend somewhat on the composition of the resin and the type and amount of catalyst used in the resin. The dependency of temperature, setting time, and catalyst on each other is well known to those in the art. We have found that in systems utilizing the two formulations specifically set out above, convenient operating temperatures may fall in the range of room temperature (about 70° F.) up to about 130° F. However, higher or lower temperatures can be used if desired. Thus, with a given resin and catalyst system, a temperature can be any temperature below the destruction temperature of the resin but should be sufficiently low to permit significant dispersion of the pattern materials by thermal currents prior to setting. The time, of course, is correlated therewith as is the catalyst. The catalysts, including promoters and initiators, are well known in the art and are included in the resins in catalytic amounts, e.g. 0.001 to 2 weight percent. Of course, the greater amount of catalyst used, the shorter will be gelation time of the resin at a given temperature. With the polyester resin Formulations I and II set out above, i.e. with 40% styrene and with inhibitor, we have found that a catalyst system including 0.3% of 60% methyl ethyl ketone peroxide and 0.3% of 2% cobalt naphthenate is highly satisfactory. Using this catalyst system in the formulations, gel time was about 4 hours at room temperature. Shortening of gelation time may be effected by increasing either the catalyst concentration or the temperature or both, and lengthening of the gel time may be effected by decreasing either or both.

The gel time of the resin system is important because the pattern achieved is dependent upon setting the resin at such time that flow currents have been established and maintained and have dispersed the particles of pattern material into a pattern. Once the thermal currents have been established and the particles have been displaced, gelation or setting should preferably occur as soon as possible. Since the occurrence of the gel state is dependent upon the amount of catalyst and temperature of the resin molding system, gel time can advantageously be controlled thereby. The gel time can be a very short period of time, e.g. on the order of 10 minutes or, on the other hand, can be measured in terms of days. Shorter gel times are preferred so that molding equipment is not unduly tied up for long periods of time. Using the Formulations I and II with the specific catalyst system defined above, gel time for many preferred resins will usually occur within a period of ½ to 8 hours at room temperature, 10 minutes to 3 hours at temperatures in the range of 5° F. above room temperatures up to 160° F. and more specifically a gel time of from ½ to 3 hours was found to be sufficient at temperatures in the range of 95 to 105° F.

The control of the pattern is effected by controlling the direction and severity of the thermal currents. The directions of currents affects the general direction of particle displacement and the severity of the currents affects an amount of particle displacement, with any given particle. The gel time is coordinated with the control of currents to cause gelation upon achieving the desired displacement of pattern material particles, thereby producing the desired pattern configuration.

The following examples are offered by way of illustration of this invention and are not intended to be construed as limitations thereon.

*Examples of bowling ball preparation*

Using four molds each of the construction described with reference to FIGURE 1, the four molds being connected in parallel series as illustrated in FIGURE 3, various sets of bowling balls were prepared in accordance herewith.

In the preparations of the bowling balls, the resin Formulation I, identified above, is dissolved in sufficient styrene to provide 40% styrene. 0.02% hydroquinone inhibitor is added to the solution. A bowling ball core is supported within each of the four molds in a system with a pump and heat exchange fluid reservoir maintained at a constant temperature of 103° F. The fluid is pumped through the top jacket of each mold. Pearlescent flake material is added to the resin in an amount of about 0.3% and thoroughly mixed with the resin solution. Aliquots of the resin are taken and a catalyst system is added to each. Each catalyst system, consisted of cobalt naphthenate as an initiator and methyl ethyl keton (MEK) peroxide as a promoter in levels varying from ¾ to 1¼ level, 1 level of cobalt naphthenate being 0.3% of 2% cobalt naphthenate (having a cobalt content of 6%) and 1 level of MEK peroxide being 0.3% of 60% MEK peroxide.

From the aliquots prepared as above a variety of bowling ball covers were molded around solid cores. Molding operations were conducted applying heat to the bottom of the mold only, i.e. by circulating the heat exchange fluid at 103° F. through the bottom jacket of the mold, to produce a design in the cover having a flower petal or "tulip" configuration. Additionally, bowling balls were molded while applying heat to the top of the mold only to produce a "feather" design in the cover. Still other bowling balls were molded while applying heat to both top and bottom of the ball to produce a "striated" design in the cover and balls with a "clamshell" pattern were produced in other molds heated by jacketing on one side of the ball. The molding operations were repeated using similar resins and similar heat exchange and it was found that the designs or configurations in the cover were reproducible. It was further found that increases in promoter content resulted in decreasing the gel time and darkening the resin slightly, but there were only very limited differences in pattern effect due to promoter concentration.

In some cases, blue pigment material was substituted for about one-half of the pearlescent material to obtain blue bowling balls which had different designs or pattern material configurations in the covers including the "tulip," "striated," "clamshell" and "feather" designs obtained above; these designs were obtained in accordance with a preselection in flow of heat fluid through the bottom jacket, both jackets and top jacket respectively. Repetition of the above examples established reproducibility of design for a given resin under given heat application during the molding operation.

It was also found that a plurality of molds can be used concurrently and associated with the same heat exchange medium to produce a plurality of balls having differing configurations by diverting the heat exchange fluid through the respective jackets corresponding to the configuration desired for each ball. In any event, the design in the cover can be controlled for preselection and reproducibility by providing the application of heat corresponding to the desired design and the design can be changed or controlled by relocating the thermal convection currents either during a molding operation or between subsequent molding operations. Specifically with respect to the mold used in the above examples, such control is effected by connecting the lines conveying heat exchange medium to the jacket or jackets adjacent which application or removal of heat is desired for establishing the convection currents.

Other balls have been prepared differing from the above in pattern or color by changing the heat differential direction through the ball or by adding other dyes or pigments. The bowling balls suffered no defects as evidenced by their excellent playing characteristics.

It is apparent from the foregoing that we have provided new and useful bowling balls and a new and useful method and system for their manufacture.

All percents herein are percents by weight unless otherwise indicated.

We claim:

1. In the making of plastic bowling balls by casting thermosetting resin wherein particles of pattern forming material are included in the resin in its fluid state, in combination therewith the improvement which comprises subjecting said resin containing said particles to thermal convection currents sufficient to realign said particles in a pattern generally corresponding to said thermal convection currents and setting said resin to a solid with said particles in their patterned configuration.

2. The improvement of claim 1 wherein said resin is a polyester.

3. The improvement of claim 1 wherein said pattern material consists of pearlescent particles.

4. The improvement of claim 1 wherein said resin contains small amounts of coloring material.

5. In the making of a plastic bowling ball cover wherein said cover is molded on a hard ball core by supporting said core in a mold substantially concentric with the mold cavity and the cover is molded by introducing into the mold cavity a thermosetting resin in its fluid state including pattern material particles suspended therein, said resin being of sufficient viscosity at the setting temperature to support said particles in suspension, and wherein said resin is set in said mold and surrounding said core, the improvement which comprises the step, prior to setting said resin, of establishing within the fluid state resin heat convection currents of sufficient strength to realign said particles in a pattern generally corresponding to said heat convection currents and conducting the setting step while said particles are so realigned and prior to achieving thermal equilibrium within said resin in its fluid state.

6. A method for providing a bowling ball of a reproducible preselected design, which method comprises disposing particles of pattern material within a thermosetting polyester resin, said resin having a viscosity in its liquid state sufficiently low to permit thermal convection currents to be established therein and sufficiently high to support said particles, charging said thermosetting resin in its fluid state to a mold subjecting the resin in said mold to preselected heat differences whereby design determining heat convection currents are set up in the body of fluid thermosetting resin, said convection currents being sufficient to realign said particles in said preselected design and being capable of relocation responsive to change in preselection of said heat differences, and setting said body of resin to its solid state.

7. The improvement of claim 6 wherein the heat convection currents are set up in the resin in the mold by application of heat to the resin about the bottom portion of the resin mass.

8. The improvement of claim 6 wherein the heat convection currents are set up in the resin in the mold by application of heat to the resin about the top portion of the resin mass.

9. The improvement of claim 6 wherein the heat convection currents are set up in the resin in the mold by application of heat to the resin about both the top and bottom portions of the resin mass.

10. The improvement of claim 6 wherein the heat convection currents are set up in the resin in the mold by application of heat to one side of the resin mass.

11. A method for providing a plurality of bowling balls of the same preselected design, which method comprises disposing particles of pattern material within a thermosetting polyester resin, said resin having a viscosity in its liquid state sufficiently low to permit thermal convection currents to be established therein and sufficiently high to support said particles, charging said thermosetting resin in its fluid state to a plurality of molds, subjecting the resin in each of said molds to similar heat differences whereby similar convection currents are set up in each body of fluid thermosetting resin, said convection currents being sufficient to realign said particles, and setting each of said bodies of resin to its solid state.

12. A process for making plastic bowling balls which process comprises mixing pattern material in an amount from about .01 to 5 weight percent with fluid thermosetting polyester resin, said particles being of sufficient size for dispersion within said resin and said resin having sufficient viscosity to support said particles, charging said resin containing said particles to a mold, subjecting said fluid state resin and particles within said mold to local temperature differences whereby thermal convection currents are set up in said resin, said resin having a viscosity sufficiently low to permit flow of thermal convection currents therethrough setting said resin to its solid state prior to return of thermal equilibrium thereto, and removing the resulting solid mass from the mold.

13. A process for making plastic bowling balls which process comprises mixing pearlescent pattern material in an amount from about 0.01 to 0.5 weight percent with liquid thermosetting polyester resin containing catalytic amounts of cobalt naphthenate initiator and peroxide promoter, said particles being of sufficient size for dispersion within said resin, charging said resin containing said particles into a mold, subjecting said liquid state resin and particles within said mold to local temperature differences at temperatures within the range of 70° F. to 130° F. whereby thermal convection currents are set up in said resin, said resin having a viscosity in the range of 300 to 600 centipoises at about 70° F., continuing the subjecting of said resin to said local temperature differences until said resin sets, and removing the resulting solidified ball from the mold.

14. A method of configuring pattern material in a thermosetting resin which method comprises subjecting the resin containing particles of said pattern material to thermal convection currents sufficient to dispose said particles in a pattern within said resin in its fluid state and transforming said resin to its solid state with said particles disposed in said pattern.

15. In the manufacture of plastic bowling balls by molding thermosetting resin about a solid central core wherein the resin in its fluid state contains particles of pattern-forming material, in combination therewith the improvement which comprises the steps of treating the surface of said core, prior to said molding step, with a first coloring material sufficient to produce a visible color change on said surface, incorporating a small amount of a second coloring material in the fluid state resin for use during said molding step, and during the molding step subjecting said resin containing said particles and coloring material to thermal convection currents sufficient to orient said particles in said resin and setting said resin to a solid with said particles oriented.

References Cited by the Examiner

UNITED STATES PATENTS

| | | | |
|---|---|---|---|
| 2,168,331 | 8/39 | Fields et al. | 264—198 |
| 2,480,749 | 8/49 | Marks | 264—327 |
| 2,837,771 | 6/58 | Jackson | 264—327 |
| 2,945,264 | 7/60 | Riccitiello et al. | 18—58 |
| 2,995,778 | 8/61 | Hill | 18—39 |
| 3,082,479 | 3/63 | Chupa | 18—39 |
| 3,089,702 | 5/63 | MacDonald | 273—63 |
| 3,090,620 | 5/63 | Consolloy | 273—63 |

FOREIGN PATENTS 772,850  4/57  Great Britain.

ALEXANDER H. BRODMERKEL, *Primary Examiner.*

DELBERT B. LOWE, ALFRED L. LEAVITT,
*Examiners.*